United States Patent [19]
Rabe et al.

[11] Patent Number: 5,347,068
[45] Date of Patent: Sep. 13, 1994

[54] METHOD OF SIMULTANEOUS DISPOSAL OF SOLID AND LIQUID WASTES

[75] Inventors: Wolfgang Rabe, Bernsdorf; Lutz Gröschel, Hoyerswerda; Karl Sowka, Dörgenhausen; Günter Scholz, Hoyerswerda; Günter Seifert, Cottbus; Manfred Dürlich, Hoyerswerda; Emil Reichl, Hoyerswerda; Heinz Polenski, Hoyerswerda, all of Fed. Rep. of Germany

[73] Assignee: Energiewerke Schwarze Pumpe Aktiengesellschaft, Pumpe, Fed. Rep. of Germany

[21] Appl. No.: 901,492

[22] Filed: Jun. 19, 1992

[30] Foreign Application Priority Data
Aug. 1, 1991 [DE] Fed. Rep. of Germany ....... 4125521

[51] Int. Cl.$^5$ .................. A62D 3/00; A61L 11/00; B09B 3/00
[52] U.S. Cl. .................. 588/205; 588/209; 588/213; 588/216; 588/226; 588/234; 588/240; 588/245
[58] Field of Search ............ 588/205, 206, 208, 209, 588/213, 216, 215, 226, 234, 240, 245

[56] References Cited

U.S. PATENT DOCUMENTS

| | | | |
|---|---|---|---|
| T104,901 | 12/1984 | Cox et al. | 588/206 |
| 4,274,839 | 6/1981 | Leas | 588/226 |
| 4,422,940 | 12/1983 | Cousino et al. | 588/228 |
| 4,732,092 | 3/1988 | Gould | 60/39.12 |

FOREIGN PATENT DOCUMENTS

| | | |
|---|---|---|
| 38791 | 9/1965 | Fed. Rep. of Germany . |
| 43253 | 9/1965 | Fed. Rep. of Germany . |
| 2532198 | 1/1971 | Fed. Rep. of Germany . |
| 110297 | 12/1974 | Fed. Rep. of Germany . |
| 119814 | 5/1976 | Fed. Rep. of Germany . |
| 121796 | 8/1976 | Fed. Rep. of Germany . |
| 132980 | 1/1977 | Fed. Rep. of Germany . |
| 2532197 | 1/1977 | Fed. Rep. of Germany . |
| 133818 | 7/1977 | Fed. Rep. of Germany . |
| 2732544 | 2/1978 | Fed. Rep. of Germany . |
| 2640180 | 3/1978 | Fed. Rep. of Germany . |
| 2705558 | 8/1978 | Fed. Rep. of Germany . |
| 150475 | 9/1978 | Fed. Rep. of Germany . |
| 3206984 | 4/1983 | Fed. Rep. of Germany . |
| 3502215 | 7/1986 | Fed. Rep. of Germany . |
| 267880 | 5/1989 | Fed. Rep. of Germany . |

*Primary Examiner*—Gary P. Straub
*Attorney, Agent, or Firm*—Michael J. Striker

[57] ABSTRACT

Method for simultaneous disposal of solid and liquid wastes including the steps of gasifying in a fixed bed pressure gasifier a gasification material containing coal and 1 to 70% of a solid waste material containing sulfur, hydrocarbons, PCBs, dioxins and/or heavy metals, to form a pollutant and dust-containing fixed bed pressure gasification crude gas; post-gasifying in a post-gasifier at a temperature greater than 1,000° C. and with a dwell time of more than 2 seconds the crude gas together with an oxygen-containing gas and a liquid waste portion having a heat content of greater than 20,000 kJ/kg and containing hydrocarbons, PCBs and/or heavy metals to form a disposal gas; cooling the disposal gas to less than 200° C. and cleaning it or process waste water to form a mixture of pollutant slurries; gasifying in an additional flow gasifier a mixture of the pollutant slurries, another liquid waste portion having a heat content of greater than 20,000 kJ/kg and containing hydrocarbons, sulfur, PCBs, heavy metals and/or dioxins and 3 to 35% of solid components containing greater than 10% mineral components and sulfur, heavy metals, PCBs, dioxins, furans and/or hydrocarbons, at a temperature more than 50° C. above a melting point of the mineral components.

4 Claims, 1 Drawing Sheet

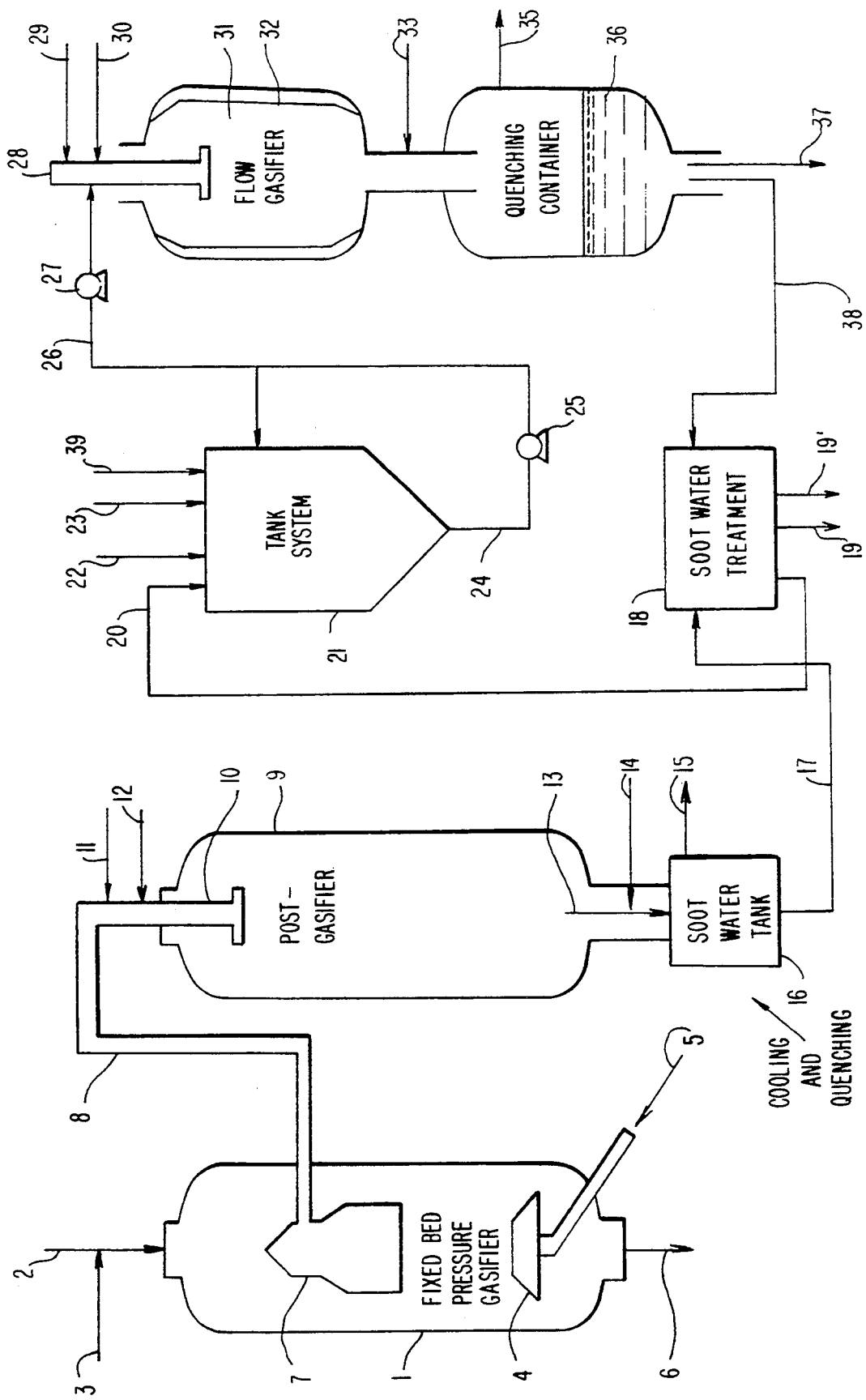

METHOD OF SIMULTANEOUS DISPOSAL OF SOLID AND LIQUID WASTES

BACKGROUND OF THE INVENTION

The present invention relates to gasification methods and, more particularly, to fixed bed pressure gasification methods, oil gasification and flow gasification as well as disposal of waste materials.

The fixed bed pressure gasification operates with various carburizing materials including crude brown coal, brown coal briquettes, hard brown coal and mineral coal. The ash and water content of these materials fluctuates within broad limits. The preparation cost of these gasification materials is low.

The basic principle of fixed bed pressure gasification is described, for example, in W. Peters, "Kohlevergasung", Verlag Glückauf GmbH, Essen. This principle is used as the basis for many fixed solid bed pressure gasification methods. Various modifications are disclosed, for example, in German Patent Documents DE-PS 2,640,180 and 2,732,544 in which a combination with a fluidized bed is proposed. In German Patent documents DD-PS 38791, 110297, 119814, 121796, 132980, 133818 and DE-PS 2,705,558 methods for efficiency increase, for liquid slag withdrawal, for lowering of the dust content of a crude gas formed in the method and for avoiding slag formation in the gasifier are described.

The main disadvantage of all practical methods is that the crude gas contains dust, high and low boiling hydrocarbons and water soluble organic compounds such as alcohol and aromatic compounds as well as their derivatives. Therefore expensive auxiliary devices are required for recovery and conversion of individual products as well as prevention of environmental damage.

German Patent document DD-PS 259,875 describes a proposed method for eliminating by-products. In this method the fuel height in the fixed bed pressure gasifier is lowered drastically. At temperatures of approximately 1000° C. attained in the gas chamber, tar, oil and dust particles contained in the crude gas are converted in the gas chamber into crude gas. This method is not recommended because of safety considerations, since oxygen breakthrough can occur through the fixed bed in the gasifier which is at a very low height, which can cause a gas explosion in downstream units.

Also German Patent Document DD-PS 43253 describes a proposed method for converting liquid and solid components contained in the gas leaving the gasifier autooxidatively while gasification medium is fed into the gas. This process is not economically practical since a part of the product gas is burned. A reliable definite conversion of the liquid and solid components during this process is not guaranteed. Since this proposed method does not have any reliable post-operational teaching, the probability of gas explosions during processing must be considered.

German Patent Document DD-PS 150,475 describes a method in which higher hydrocarbons are converted by hydrocracking using a hydrogenation catalyst during post-gasification of the fixed bed pressure gasification crude gas. This method has the disadvantage that the entry temperature of the crude gas in the post-gasifier must be adjusted to the operational temperature of the catalyst. When brown coal is used in this gasification method, that can be accomplished only with complicated control and process techniques. An additional disadvantage of this method is the rapid poisoning of the catalyst with coal dust and ash particles entrained in the crude gas stream and therefore high operating costs. Furthermore German Published Patent Applications DE-OS 2,532,197 and 2,532,198 disclose proposed methods in which fixed bed pressure gasification crude gas is supplied with additional oxygen for post-gasification in a post-gasifier which contains a solid bed of inert or catalyst material so that gasification and cracking reactions occur in the post-gasification because of the temperature increase. This process is however disadvantageous because it is not possible to control crude gas composition and crude gas quantity in the post-gasifier. The solid bed height in the post-gasifier can result in efficiency decreases and stoppages of the gasification due to contamination with dust and ash.

Special waste materials are waste materials which originate from industrial and similar enterprises and public installations which are especially hazardous to health or especially damaging to air or water because of their type, properties or amounts. The primary industries producing special wastes are the chemical industry, the metalworking industry, the energy industry and waste industry. Sulfur-containing, hydrocarbon-containing and halogenated wastes are produced in the chemical industry. Oil emulsions, varnish slurries and galvanic wastes are produced by the metalworking industry. In thermal waste processing installations, e.g. for combustion and pyrolysis, partially loaded residues and flue and filter dusts in the areas of heat consumption and gas cleaning cause particular problems during their disposal. Particularly the contamination of these dusts with organic pollutants, such as dioxin and furan, as well as with heavy metals can cause severe environmental damage when these dusts are stored. For these and similar special wastes some proposed methods to process these wastes by bonding with clay-containing materials were disclosed in German Patent Documents 3,918,259, 3,713,482 and 3,919,011; or to process heavy metal containing residues to form solid storable products, such as described in German Patent Document DE-PS 3,502,215. In the case of the latter method, these products can be stored partially underground, but at very high cost.

Alternative methods include methods involving fusion or melting. Such methods are disclosed for example in the German Patent Documents DE-PS 3,939,344 and 3,206,984. The units or plants described in these Patent Documents require however a large amount of energy. They are still in the stage of laboratory and pilot plants and to reduce them to practice requires significant development efforts and time expenditures.

A proposed method known from gasification engineering and described in German Patent Document DD-PS 267,880 includes supplying an ash-containing liquid fuel separately and independently from a burner which is acted on with a dust-like fuel and the required oxygen for autothermal partial oxidation of the ash-containing liquid fuel by a coal dust burner of a gasification reactor, which is also fed steam via an inlet connector pipe. The gasification of the liquid waste occurs according to this method with a high consumption of coal dust which leads to high gas production costs. The amount of input liquid residues is very limited in this process.

SUMMARY OF THE INVENTION

Accordingly, it is an object of the present invention to provide a method of simultaneously disposing of solid and liquid wastes which avoids the disadvantages of the prior art.

More particularly, it is an object of the present invention to provide a method of simultaneous disposal of solid and liquid wastes in which the gasification method is efficient and environmentally safe.

In keeping with these objects and others which will be made more apparent hereinafter, the method of simultaneous disposal of solid and liquid wastes comprises the steps of:

a. gasifying in a fixed bed pressure gasifier a gasification material consisting of 99 to 30% of brown coal briquettes and 1 to 70% of a solid waste material containing at least one member selected from the group consisting of sulfur, hydrocarbons, PCBs, dioxins and heavy metals, to form a pollutant and dust-containing fixed bed pressure gasification crude gas;

b. post-gasifying in a post-gasifier at a temperature greater than 1,000° C. and with a dwell time of more than 2 seconds the crude gas from step a) together with an oxygen-containing gas and a liquid waste portion having a heat content of greater than 20,000 kJ/kg and containing at least one member selected from the group consisting of hydrocarbons, PCBs and heavy metals to form a disposal gas;

c. cooling the disposal gas to less than 200° C. and quenching to form a waste water; and d. gasifying in a flow gasifier the soot water together with at least one pollutant slurry, another liquid waste portion having a heat content of greater than 20,000 kJ/kg and containing at least one member selected from the group consisting of hydrocarbons, sulfur, PCBs, heavy metals and dioxins and solid components comprising a solid waste, the solid components containing greater than 10% mineral components and at least one member selected from the group consisting of sulfur, heavy metals, PCBs, dioxins, furans and hydrocarbons, the solid components being present in an amount equal to 3 to 35% by weight of a total amount of the soot water, the at least one pollutant slurry, the other liquid waste portion and the solids components, at a temperature more than 50° C. above a melting point of the mineral components.

In a preferred embodiment of the method the post-gasifier and the flow gasifier are operated so as to convert the liquid waste portion and the crude gas into a PCB-free and hydrocarbon-free disposal gas in the post-gasifier and to convert the soot water, the at least one pollutant slurry, the other liquid waste portion and the solid components in the flow gasifier into a slag having a heavy metal component fused therein and a dioxin-free product gas from the flow gasifier.

The novel features which are considered as characteristic for the invention are set forth in particular in the appended claims. The invention itself, however, both as to its structure and method of operation, together with additional objects and advantages thereof, will be best understood from the following description of preferred embodiments when read in connection with the accompanying drawing.

BRIEF DESCRIPTION OF THE DRAWINGS

The sole figure is a schematic view of a method of simultaneously gasifying solid and liquid wastes according to the present invention.

DESCRIPTION OF THE PREFERRED EMBODIMENTS

In accordance with the method of the present invention a gasifying material, or material to be gasified, comprising 1 to 70% of solid waste material containing sulfur and/or hydrocarbons and/or PCBs and/or dioxins and/or heavy metals is gasified in a fixed bed pressure gasifier. This solid waste material, which can include, e.g., loaded active coke, contaminated clay, old tire chips, shreaded light products, oil-contaminated textile wastes or synthetic plastic wastes can be fed to the fixed bed gasification reaction either mixed with carbon or bonded in a carbon matrix by briquetting techniques. The heavy metals contained in the solid waste material are primarily bonded in the slag produced by the fixed bed pressure gasifier and that slag can be used as a structured material or can be dumped. The pollutant and dust-containing fixed bed pressure gasification crude gas produced in the gasifier is heated in a post-gasification step by combustion at a burner to more than 1,000° C. together with a liquid waste material which has a heat content of more than 20,000 kJ/kg and contains hydrocarbons and/or PCBs. The liquid waste material and the pollutant and dust-containing fixed bed pressure gasification crude gas are partially burned and partially gasified in this post-gasification step. The oxygen minimum quantity used is thus the amount of oxygen required to heat the gas mixture to more than 1,000° C.

The total gas quantity produced during performance of the method is determined by the amount of fixed bed pressure gasification crude gas produced and of the liquid waste material used. The liquid waste material can be disposed waste oil or emulsion cracking products. The post-gasifier has a geometrical shape so that the dwell time of the gas in the post-gasifier is more than 2 seconds. After leaving the post-gasifier, the disposal gas is cooled in a shock-like manner to less than 200° C.

According to the present invention the post-gasifier is operated with a fixed bed pressure gasification crude gas for disposal of liquid waste materials to produce a hot disposal gas. This hot disposal gas is quenched in a quenching step to produce a soot water which is freed of 99% of its components. A mixture of the soot water with a liquid waste material having a heat content greater than 20,000 kJ/kg and containing hydrocarbons and/or sulfur and/or PCBs and heavy metals and/or dioxins and 3 to 35% solid components are gasified in a flow gasifier having a reaction inner wall formed as a cold tubular screen. The flow gasifier has a liquid slag outlet. The solid components contain more than 10% mineral components and sulfur and/or heavy metals and/or PCBs and/or dioxins and/or hydrocarbons. The grain size of the solid components used in the process amounts to approximately less than 0.5 mm.

The gasification in the flow gasifier is performed at a reaction temperature 50° C. higher than the melting temperature of the mineral components of the solid components and thus at least above 1,200° C. The dwelling time of the gas produced in the flow gasifier at the reaction temperature amounts to more than 2 seconds prior to shock-like cooling of the produced slag-containing gas to less than 200° C.

When the method according to the invention is used, the liquid waste materials and the solid components to be disposed of by the method in the flow gasifier can include pollutant-loaded waste oils mixed with varnish slurries, sewage slurries and flue and filter dusts from waste gas cleaning devices. It is also possible to use solid matter containing tar residues from the carbon processing and mineral oil industry.

During the entire process the residual components of pollutants produced during cooling of the liquid phase are separated by known methods from the aqueous phase and supplied in a known manner to the fixed bed pressure gasification and the flow gasification. Similarly, pollutant components present in trace amounts, especially heavy metals, are washed out from the crude gas by a low temperature wash, and the wash means after washing the crude gas are fed back to the gasification reactors.

The advantage of the above-described inventive method is a simultaneous disposal of liquid waste materials and solid waste components. The solid wastes mixed with heavy metal containing residues from the soot water treatment are disposed of with the reaction heat produced during disposal of liquid waste material in the flow gasifier. Thus the heavy metal of the liquid waste material and the soot water are bound in the mineral components of the solid wastes. An additional advantage of the method is that the combined disposal of the solid and liquid wastes in the gasification process is very environmentally relevant and also provides an added source of raw materials in a method that has a high efficiency due to its energy utilization. The incorporation of the pollutants produced in gas and waste water cleaning into the gasification and melting process of the wastes leads to a new complex disposal method for both solid and liquid wastes.

The method according to the invention is illustrated in further detail in the following example, reference being made to the drawing figure.

EXAMPLE

The following components are supplied to a fixed bed pressure gasifier 1 operating at a pressure of 25 bar:
- 13.7 t/h brown coal briquette (water content 18.5%, tar content 8%, ash content 8%);
- 3.1 t/h contaminated clay with a hydrocarbon content of 5%;
- 1.7 t/h old tires; and
- 1.7 t/h shreaded light product.

The solid waste materials supplied to gasifier 1 are fed at line 3 in the figure and include the old tires, the light product and the contaminated clay. The coal briquettes are supplied at line 2.

A mixture 5 of 2,500 m$^3$/h of oxygen at standard conditions of temperature and pressure and 16.4 t/h of gasification steam is fed into the gasification reactor 1 through a rotary grate 4.4 t/h of an inert ash/slag mixture 6 flows past the rotary grate 4 and from an outlet of the gasifier 1. It can be used as a building or filling material and can be stored with no danger. The hydrocarbons contained in the contaminated clay fed in through line 3 are distilled, cracked and gasified in the fixed bed pressure gasifier 1.

Forty to seventy percent of the old tire and shreaded light products are converted to gas components and 20 to 50% of these products, to hydrocarbons. 3 to 12% of the old tire and shreaded light products are converted to the ash/slag fraction depending on the composition. The residue from the gasification is discharged as the ash/slag mixture 6 through the rotary grate 4.

The gasifier 1 has a crude gas collecting chamber 7 connected to a post-gasifier 9 for collection of the product fixed bed pressure gasifier crude gas. The crude gas collecting chamber 7 in this example collects 20,700 m$^3$/h of a dry crude gas as measured at standard conditions of temperature and pressure and 13,800 m$^3$/h water steam and this gas mixture is fed at a temperature of approximately 150° C. through crude gas collecting duct 8 to the burner 10 of the post-gasifier 9 operating at a pressure of 24 bar. This dry crude gas has the following composition:

| | |
|---|---|
| $CO_2$ | 33.5% |
| CO | 15.0% |
| $H_2$ | 36.0% |
| $CH_4$ | 12.5% |
| $N_2$ | 0.9% |
| $O_2$ | 0.1% |
| $C_1$ to $C_4$ | 2.0% |

Furthermore, the crude gas contains approximately 90 g/m$^3$ (measured at S.T.P.) cyclic and aliphatic hydrocarbons and 10 g/m$^3$ of dust containing approximately 20% ash components.

Simultaneously 11 t/hr of waste oil is fed through line 11 in the figure and oxygen is supplied through line 12 at 11,000 m$^3$/h (at S.T.P.) to the post-gasifier 9. This waste oil has a heat content of 32,000 kJ/kg and a PCB content of 200 mg/kg. The waste oil fed through line 11 contains the following heavy metal composition:

| | |
|---|---|
| Ni | 1,000 mg/kg |
| Ba | 2,000 mg/kg |
| Cu | 600 mg/kg |
| V | 300 mg/kg |
| Pb | 900 mg/kg |

In the post-gasifier 9 the fixed bed pressure gasification crude gas and the waste oil are subjected to an autothermal gasification with a high material conversion. In a brick reactor with a volume of 75 m$^3$ this conversion is performed at a temperature of 1,350° C. The conversion of the hydrocarbons of the crude gas of the fixed bed pressure gasifier and the waste oil is performed by direct contact with the flame of the burner, by radiated heat and by contact with a hot inner casing of the post-gasifier 9.

The disposal gas flow 13 of 62,000 m$^3$/h (measured at S.T.P.) leaves the post-gasifier 9 at 1,350° C. after a dwelling time with the following composition on a dry basis:

| | |
|---|---|
| $CO_2$ | 18.6% |
| CO | 33.5% |
| $H_2$ | 46.6% |
| $CH_4$ | 0.3% |
| $N_2$ | 1.0% |
| $O_2$ | 0.1% |

The cleaned disposal gas flow 15 is free of PCBs and hydrocarbons and was cooled by a quenching liquid flow 14 to less than 200° C. Alternatively an intermediate waste heat recovery can be performed to obtain heat for utilizing heat content until this disposal gas is at about 500° C. The cleaned disposal gas 15, after a conventional gas cleaning, can be used as a product or for energy supply. A condensate 17 collected in a soot water tank 16 provided after the post-gasifier 9 is free of tar, oil, phenol and PCBs and is further treated in a soot water treatment unit 18. The waste water discharging from the soot water treatment unit 18 requires only simple processing, e.g. waste water cleaning, and is discharged at 19'.

The heavy metal containing soot pellets 19 produced in the soot water treatment unit 18 which operates according to a pellet processing method, are fed from the soot water treatment unit at a total rate of 400 kg/h and from there to a tank system 21. Simultaneously the tank system 21 is supplied with 1000 kg/day of a heavy metal and salt slurry from the waste water treatment and from a low temperature gas cleaning at line 39. This added material is mixed with a gasification material mixture for introduction into the flow gasifier 31. In the tank system 21 waste oil fed through line 23 with a heat content of 33,000 kJ/kg and the following composition of pollutants:

| PCB | 200 mg/kg |
|---|---|
| Ni | 2,000 mg/kg |
| Pb | 2,000 mg/kg |
| Zn | 2,500 mg/kg |
| S | 4% | is mixed with 0.1 kg of sewage slurry per kg waste oil fed through line 22. The sewage slurry is dried to 15% water content and contains 10% mineral components and has the following metals composition:

| Pb | 1,000 mg/kg |
|---|---|
| Cu | 500 mg/kg |
| Zn | 2,000 mg/kg. |

The waste oil is also mixed with 0.15 kg of filter dust/kg waste oil fed through line 22 from the cleaning stage of garbage combustion flue gas/kg waste oil which contains 60% mineral components with the following pollutant composition:

| 200 mg | PC DD and PC DF/g |
|---|---|
| 6,000 mg | Pb/kg |
| 24,000 mg | Zn/kg |
| 1,000 mg | Cu/kg |
| 1,700 mg | Sn/kg |
| 1,400 mg | Cr/kg |

Soot water is also fed to the tank system 21 for gasification in the flow gasifier over the line 20. The waste oil-waste mixture including the soot water fed over line 20 is circulated by a circulating system 24 and a pump 25 to avoid deposits.

12 t/h of the waste oil-waste mixture is supplied through a branch conduit 26 and a dosing pump 27 to the burner 28 in the flow gasifier 31 operating at a pressure of 25 bar and having a volume of 30 m³. Its reaction chamber casing 32 is positively cooled. The high pressure steam supplied through line 30 at a rate of 4 t/h serves both for whirling the waste oil-waste mixture and also as a gasification medium. Oxygen is supplied through line 29 at a rate of 10,000 m³/h at S.T.P. for autothermal partial oxidation of the waste oil and organic components of the solid wastes fed through the tank system 21 into gasifier 31. The melting point of the mineral components of the solid components is at 1,250° C.

The gas outlet temperatures are adjusted to 1,400° C. by the flame reactions. During gasification in the gasifier 31 40,000 m³/h of product gas is produced as well as a slag product in liquid form. The average dwelling time in the flow gasifier 31 is 2.7 seconds.

A cooling of the product gas occurs by a quenching flow 33 as the product gas is fed with the product slag in liquid form to a quenching container 34 for quenching of the product gas to 200° C. The slag which is discharged from the quenching container 34 through line 37 is granulated after passing through water bath 36 in the quenching container 34. The heavy metal components of the wastes are fused in the slag and are not eluted. The slag can be used as a structural material or dumped without danger. The soot water produced in the quenching container 16 associated with the post-gasifier 9 is tar-, oil-, phenol- and PCB-free and is fed to the soot water treatment unit 18. The cooled cleaned product gas 35 contains no detectable dioxin amounts and is used after a desulfurization as a combustible gas.

While the invention has been illustrated and embodied in a method of simultaneous disposal of solid and liquid waste materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Method for simultaneous disposal of solid and liquid wastes comprising the steps of:
   a. gasifying in a fixed bed pressure gasifier a gasification material consisting of 99 to 30% of brown coal briquettes and 1 to 70% of a solid waste material containing at least one member selected from the group consisting of sulfur, hydrocarbons, PCBs, dioxins and heavy metals, to form a fixed bed pressure gasification crude gas;
   b. post-gasifying in a post-gasifier at a temperature greater than 1,000° C. and with a dwell time of more than 2 seconds the crude gas from step a) together with an oxygen-containing gas and a liquid waste portion having a heat content of greater than 20,000 kJ/kg and containing at least one member selected from the group consisting of hydrocarbons, PCBs and heavy metals to form a disposal gas;
   c. cooling said disposal gas to less than 200° C. and quenching to form a soot water; and
   d. gasifying in a flow gasifier said soot water together with at least one pollutant slurry, another liquid waste portion having a heat content of greater than 20,000 kJ/kg and containing at least one member selected from the group consisting of hydrocarbons, sulfur, PCBs, heavy metals and dioxins and solid components comprising a solid waste, said solid components containing greater than 10% mineral components and at least one member selected from the group consisting of sulfur, heavy metals, PCBs, dioxins, furans and hydrocarbons, the solid components being present in an amount equal to 3 to 35% by weight of a total amount of said soot water, said at least one pollutant slurry, said other liquid waste portion and the solid components, at a temperature more than 50° C. above a melting point of said mineral components.

2. Method as defined in claim 1, wherein said post-gasifier and said flow gasifier are operated so as to convert said liquid waste portion and said crude gas in said post-gasifier into said disposal gas so that said disposal gas is free of PCBs and hydrocarbons after said cooling and quenching and to convert said soot water, said at least one pollutant slurry, said other liquid waste portion and the solid components in said flow gasifier into a slag having a heavy metal component fused therein for disposal and a dioxin-free product gas.

3. Method for simultaneous disposal of solid and liquid wastes comprising the steps of:
   a. gasifying in a fixed bed pressure gasifier a gasification material consisting of 99 to 30% of brown coal briquettes and 1 to 70% of a solid waste material containing at least one member selected from the group consisting of sulfur, hydrocarbons, PCBs, dioxins and heavy metals, to form a fixed bed pressure gasification crude gas;
   b. post-gasifying in a post-gasifier at a temperature greater than 1,000° C. and with a dwell time of more than 2 seconds the crude gas from step a) together with an oxygen-containing gas and a liquid waste portion having a heat content of greater than 20,000 kJ/kg and containing at least one member selected from the group consisting of hydrocarbons, PCBs and heavy metals to form a disposal gas;
   c. cooling said disposal gas to less than 200° C. and quenching with water to form a soot water;
   d. gasifying in a flow gasifier said soot water together with at least one pollutant slurry, another liquid waste portion having a heat content of greater than 20,000 kJ/kg and containing at least one member selected from the group consisting of hydrocarbons, sulfur, PCBs, heavy metals and dioxins and solid components comprising a solid waste, said solid components containing greater than 10% mineral components and at least one member selected from the group consisting of sulfur, heavy metals, PCBs, dioxins, furans and hydrocarbons, the solid components being present in an amount equal to 3 to 35% by weight of a total amount of said soot water, said at least one pollutant slurry, said other liquid waste portion and the solid components, at a temperature more than 50° C. above a melting point of said mineral components; and
   e. operating said fixed bed pressure gasifier, said post-gasifier and said flow gasifier so as to simultaneously dispose of said solid waste material, said liquid waste portions and said solid components.

4. Method as defined in claim 3, wherein said gasifying in said fixed bed pressure gasifier occurs at 25 bar and 1350° C.

* * * * *